US011629894B2

(12) United States Patent
Nemit, Jr. et al.

(10) Patent No.: US 11,629,894 B2
(45) Date of Patent: Apr. 18, 2023

(54) ECONOMIZER CONTROL SYSTEMS AND METHODS

(71) Applicant: Johnson Controls Technology Company, Auburn Hills, MI (US)

(72) Inventors: Paul Nemit, Jr., Greencastle, PA (US); Angela Marie Comstock, Roanoke, VA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 530 days.

(21) Appl. No.: 16/739,308

(22) Filed: Jan. 10, 2020

(65) Prior Publication Data

US 2021/0215408 A1 Jul. 15, 2021

(51) Int. Cl.
*F25B 31/02* (2006.01)
*F04B 49/22* (2006.01)
*F04C 29/00* (2006.01)

(52) U.S. Cl.
CPC .......... *F25B 31/023* (2013.01); *F04B 49/225* (2013.01); *F04C 29/0014* (2013.01); *F25B 2400/13* (2013.01); *F25B 2600/2509* (2013.01)

(58) Field of Classification Search
CPC ...... F25B 31/023; F04B 49/225; F04C 28/12; F04C 28/125; F04C 28/26; F04C 29/0014
See application file for complete search history.

(56) References Cited

U.S. PATENT DOCUMENTS

| 5,063,750 | A | * | 11/1991 | Englund | ................. F04C 28/16 62/196.3 |
| 5,816,055 | A | * | 10/1998 | Ohman | ................... F25B 1/047 62/196.3 |
| 2018/0258922 | A1 | | 9/2018 | Ascani | |
| 2019/0048873 | A1 | * | 2/2019 | Lee | ......................... F04C 18/16 |

FOREIGN PATENT DOCUMENTS

| EP | 203477 A | * | 12/1986 | ............ F04C 28/125 |
| EP | 3165770 A1 | | 5/2017 | |
| WO | 2007064321 A1 | | 6/2007 | |

OTHER PUBLICATIONS

PCT International Search Report and Written Opinion for PCT Application No. PCT/US2021/012784 dated Mar. 25, 2021, 11 pgs.

* cited by examiner

*Primary Examiner* — Kenneth J Hansen
(74) *Attorney, Agent, or Firm* — Fletcher Yoder P.C.

(57) ABSTRACT

An economizer control system includes a compressor including a compression area, a piston chamber, and an economizer inlet configured to receive economizer vapor into the compression area via a flow path that extends between the economizer inlet and the compression area. At least a portion of the flow path traverses the piston chamber. The economizer control system also includes a piston disposed within the piston chamber and configured to contact the economizer vapor. The piston is moveable between an open position that opens the flow path and a closed position that closes the flow path. Additionally, the economizer (Continued)

control system includes a biasing system configured to apply force to the piston to bias the piston toward the closed position.

19 Claims, 9 Drawing Sheets

ECONOMIZER CONTROL SYSTEMS AND METHODS

BACKGROUND

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Vapor compression systems, or chiller systems, are utilized in residential, commercial, and industrial environments to control environmental properties, such as temperature and humidity, for occupants of the respective environments. The vapor compression system circulates a working fluid, typically referred to as a refrigerant, which changes phases between vapor, liquid, and combinations thereof in response to exposure to different temperatures and pressures associated with operation of the vapor compression system. The vapor compression system may place the working fluid in a heat exchange relationship with a conditioning fluid (e.g., water) and may deliver the conditioning fluid to conditioning equipment and/or a conditioned environment of the vapor compression system. In such applications, the conditioning fluid may be passed through downstream equipment, such as air handlers, to condition other fluids, such as air in a building. In typical vapor compression systems, the conditioning fluid is cooled by an evaporator that absorbs heat from the conditioning fluid by evaporating working fluid. The working fluid is then compressed by a compressor and transferred to a condenser. In the condenser, the working fluid is cooled, typically by a water or air flow, and condensed into a liquid.

In some conventional designs, an economizer is utilized in the vapor compression system to improve performance at full loads of the vapor compression system. For example, the economizer may be a flash tank that receives condensed working fluid from the condenser and causes the liquid working fluid to at least partially evaporate. The resulting vapor may be extracted from the economizer and redirected to the compressor, while the remaining liquid working fluid from the economizer is directed to the evaporator. Unfortunately, existing flash tank economizers may be inefficient for vapor compression systems operating at less than full loads. For example, at a part load operating condition, the flow of vapor directed from the economizer and to the compressor may be below a particular pressure threshold, reducing economizing efficiency and/or enabling pressurized oil from the compressor to flow backward into the economizer. Some vapor compression systems resolve certain issues associated with part load operation of the economizer by controlling a solenoid valve to fluidly isolate an outlet of the economizer from the compressor at part loads. However, due to their size, such valves may be complex, unreliable, and/or cause pressure drops in vapor flows associated with full load operation, which hinders performance of the vapor compression systems.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an economizer control system for a vapor compression system includes a compressor including a compression area, a piston chamber, and an economizer inlet configured to receive economizer vapor into the compression area via a flow path that extends between the economizer inlet and the compression area. At least a portion of the flow path traverses the piston chamber. The economizer control system also includes a piston disposed within the piston chamber and configured to contact the economizer vapor. The piston is moveable between an open position that opens the flow path and a closed position that closes the flow path. Additionally, the economizer control system includes a biasing system configured to apply force to the piston to bias the piston toward the closed position.

In another embodiment, a vapor compression system includes an economizer having a vapor outlet and a compressor having a housing that defines a compression area. The housing includes a channel configured to receive vapor from the vapor outlet of the economizer and a passageway disposed between and communicatively coupled with the channel and the compression area. The passageway extends crosswise to the channel and is configured to direct the vapor from the channel to the compression area. The vapor compression system also includes a piston configured to move within the channel and a biasing system configured to bias the piston to a closed position in which the piston seals the passageway relative to the channel. In response to the vapor having a threshold pressure, the biasing system is configured to enable the piston to move to an open position in which the piston enables the vapor to flow from the channel, through the passageway, and into the compression area.

In another embodiment, a method of economizing a vapor compression system using a controller includes directing economizer vapor from an economizer to an economizer inlet of a housing of a compressor. The housing includes a flow path that traverses a piston chamber of the housing and extends between the economizer inlet and a compression area of the housing. The method includes biasing a piston disposed within the piston chamber toward a closed position via a biasing system of the vapor compression system. The piston in the closed position is configured to block the flow path to fluidly separate the economizer inlet from the compression area. Additionally, the method includes, in response to the economizer vapor having at least a threshold pressure, enabling the economizer vapor to move the piston to an open position that enables the economizer vapor to flow to the compression area from the piston chamber.

Other features and advantages of the present application will be apparent from the following, more detailed description of the embodiments, taken in conjunction with the accompanying drawings which illustrate, by way of example, the principles of the application.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present disclosure are directed toward a heating, ventilation, air conditioning, and refrigeration (HVAC&R) system having an economizer control system integrated with a compressor to automatically control a vapor flow to the compressor from an economizer. As mentioned, the economizer may improve operation of a given HVAC&R system, such as by providing additional capacity to and improving efficiency of the HVAC&R system. Generally, a fluid conduit may couple a vapor outlet of the economizer to a port or vapor inlet into the compressor. Based on the position of the port between a suction end and a discharge end of the compressor, the port may have a specific pressure for each particular operating condition of the compressor. As such, the port enables sufficiently-pressurized vapor from the economizer to flow into a compression area of the compressor. Within the compression area, the vapor flow from the economizer is compressed with negligible additional power usage, thereby enabling the economizer to function as a nearly frictionless, additional compressor that improves the capacity and efficiency of the HVAC&R system. Because operation of the economizer depends on a pressure difference between the compressor and the economizer, at low or part loads (e.g., below a threshold load) of the HVAC&R system, it may be desirable to close the fluid conduit connecting the economizer to the compressor in response to the pressure difference being unsuitably low, such as to prevent fluid or oil leakage from the compressor to the economizer. Traditional HVAC&R systems may prevent oil leakage along the fluid conduit from the compressor to the economizer by positioning a relatively large valve (e.g., solenoid valve) along the fluid conduit. However, it is now recognized that, because the valve may have a considerable size suitable for enabling vapor flow at full load, the valve is often expensive, complex, and/or unreliable. In certain cases, the valve also causes undesired pressure drop along the fluid conduit when flow therethrough is permitted.

Accordingly, to address the issues set forth above, the presently disclosed economizer control system implements control components that are formed with or integrated with a housing of the compressor, thereby automatically controlling the vapor flow from the economizer based on the pressure difference between the economizer and the compressor. For example, a passageway of the housing that enables vapor to flow into the compression area may have a first end that is fluidly connected to the compression area. A second end of the passageway, opposite the first end, may be fluidly coupled to an intersecting channel of the housing, which may generally extend perpendicularly to the passageway and couple the passageway to the economizer. Notably, the economizer control system also includes a piston that is moveable within a portion of the intersecting channel, selectively blocking or opening the passageway based on the pressure difference between the economizer and the compression area. For example, in some embodiments, a spring or other biasing device is coupled between a distal end of the intersecting channel and the piston. The spring may bias the piston to a closed position, in which the passageway is closed or sealed from the economizer. Then, as vapor from the economizer enters a proximal end of the intersecting channel, the vapor may apply force to the piston to compress the spring. In response to the vapor having a suitable pressure above a threshold, the piston may be moved to uncover the passageway. Therefore, the vapor is able to flow from the proximal end of the intersecting channel and through the passageway to automatically economize the HVAC&R system. In other embodiments, the spring or biasing element may be replaced by an actively controlled pressurized fluid source, such as an external fluid that is not typically used during operation of the HVAC&R system, or alternatively, a flow directed from an additional port of the compressor and coupled to the distal end of the intersecting channel. As such, the economizer control system provides improved control of the economizer and operation of the HVAC&R system by selectively blocking the vapor flow into the compressor and/or the oil flow out of the compressor, based on a current pressure difference between the economizer and the compressor.

Figure 1:
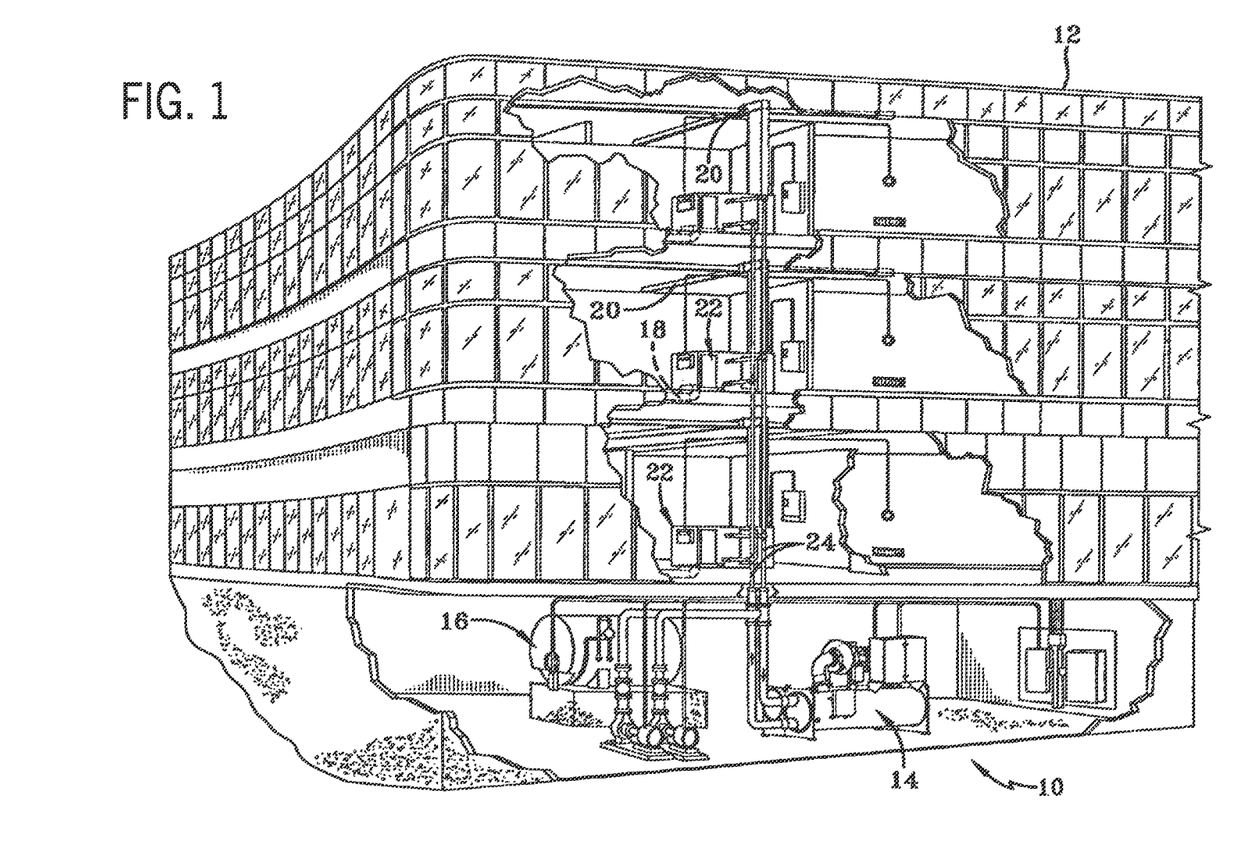
FIG. 1 is a perspective view of an embodiment of a building that may utilize a heating, ventilation, air conditioning, and refrigeration (HVAC&R) system in a commercial setting, in accordance with an aspect of the present disclosure.

Turning now to the drawings, FIG. 1 is a perspective view of an embodiment of an environment for a heating, ventilation, air conditioning, and refrigeration (HVAC&R) system 10 in a building 12 for a typical commercial setting. The HVAC&R system 10 may include a vapor compression system 14 that supplies a chilled liquid, which may be used to cool the building 12. The HVAC&R system 10 may also include a boiler 16 to supply warm liquid to heat the building 12 and an air distribution system which circulates air through the building 12. The air distribution system can also include an air return duct 18, an air supply duct 20, and/or an air handler 22. In some embodiments, the air handler 22 may include a heat exchanger that is connected to the boiler 16 and the vapor compression system 14 by conduits 24. The heat exchanger in the air handler 22 may receive either heated liquid from the boiler 16 or chilled liquid from the vapor compression system 14, depending on the mode of operation of the HVAC&R system 10. The HVAC&R system 10 is shown with a separate air handler on each floor of building 12, but in other embodiments, the HVAC&R system 10 may include air handlers 22 and/or other components that may be shared between or among floors.

Figure 2:
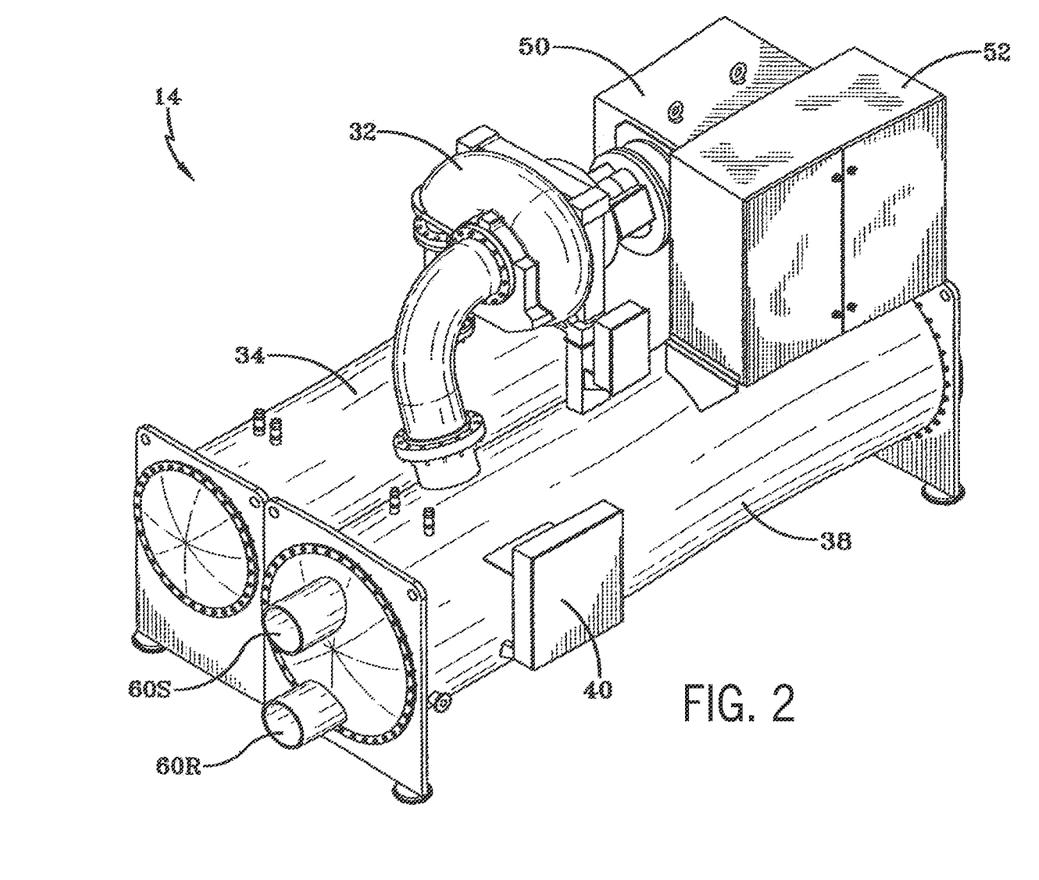
FIG. 2 is a perspective view of an embodiment of a vapor compression system, in accordance with an aspect of the present disclosure.
Figure 3:
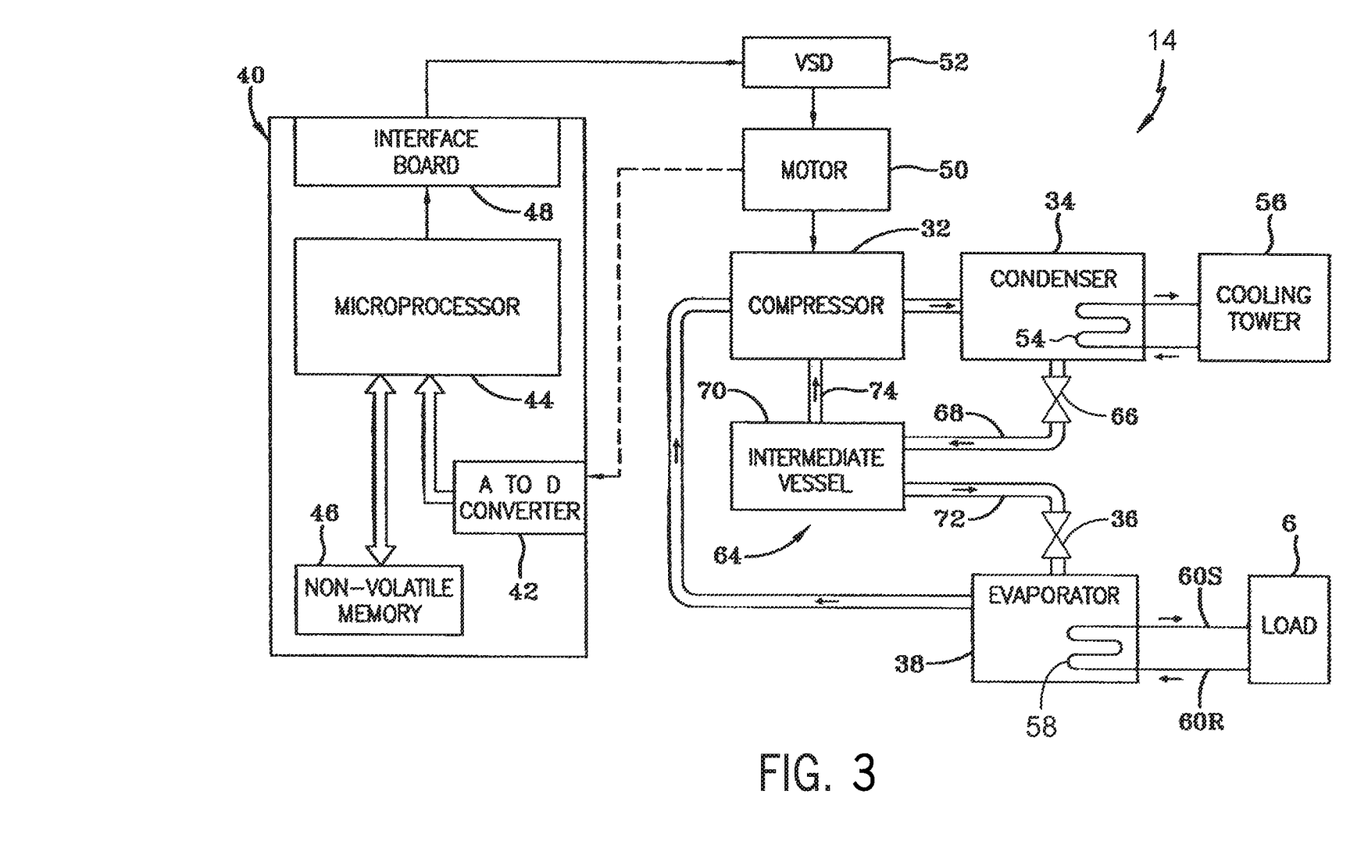
FIG. 3 is a schematic of an embodiment of the vapor compression system of FIG. 2, in accordance with an aspect of the present disclosure.

FIGS. 2 and 3 are embodiments of the vapor compression system 14 that can be used in the HVAC&R system 10. The vapor compression system 14 may circulate a refrigerant through a circuit starting with a compressor 32. The circuit may also include a condenser 34, expansion valve(s) or device(s) 36 and 66, an intermediate vessel 70, and a liquid chiller or an evaporator 38. The vapor compression system 14 may further include a control panel 40 that has an analog to digital (A/D) converter 42, a microprocessor 44, a non-volatile memory 46, and/or an interface board 48.

Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor, or any other suitable refrigerant. In some embodiments, the vapor compression system 14 may be configured to efficiently utilize refrigerants having a normal boiling point of about 19 degrees Celsius (66 degrees Fahrenheit) at one atmosphere of pressure, also referred to as low pressure refrigerants, versus a medium pressure refrigerant, such as R-134a. As used herein, "normal boiling point" may refer to a boiling point temperature measured at one atmosphere of pressure.

In some embodiments, the vapor compression system 14 may use one or more of a variable speed drive (VSDs) 52, a motor 50, the compressor 32, the condenser 34, the expansion valve or devices 36 and 66, the intermediate vessel 70, and/or the evaporator 38. The motor 50 may drive the compressor 32 and may be powered by a variable speed drive (VSD) 52. The VSD 52 receives alternating current (AC) power having a particular fixed line voltage and fixed line frequency from an AC power source, and provides power having a variable voltage and frequency to the motor 50. In other embodiments, the motor 50 may be powered directly from an AC or direct current (DC) power source. The motor 50 may include any type of electric motor that can be powered by a VSD or directly from an AC or DC power source, such as a switched reluctance motor, an induction motor, an electronically commutated permanent magnet motor, or another suitable motor.

The compressor 32 compresses a refrigerant vapor and delivers the vapor to the condenser 34 through a discharge passage. In some embodiments, the compressor 32 may be a centrifugal compressor. The refrigerant vapor delivered by the compressor 32 to the condenser 34 may transfer heat to a cooling fluid (e.g., water or air) in the condenser 34. The refrigerant vapor may condense to a refrigerant liquid in the condenser 34 as a result of thermal heat transfer with the cooling fluid. In the illustrated embodiment of FIG. 3, the condenser 34 is water cooled and includes a tube bundle 54 connected to a cooling tower 56, which supplies the cooling fluid to the condenser.

In the illustrated embodiment, the vapor compression system 14 also includes an intermediate circuit 64 incorporated between condenser 34 and the evaporator 38. The intermediate circuit 64 may have an inlet line 68 that is directly fluidly connected to the condenser 34. In other embodiments, the inlet line 68 may be indirectly fluidly coupled to the condenser 34. As shown in the illustrated embodiment of FIG. 3, the inlet line 68 includes a first expansion device 66 positioned upstream of the intermediate vessel 70. In some embodiments, the intermediate vessel 70 may be a flash tank (e.g., a flash intercooler). In other embodiments, the intermediate vessel 70 may be configured as a heat exchanger or a "surface economizer." In the illustrated embodiment, the intermediate vessel 70 is used as a flash tank, and the first expansion device 66 is configured to lower the pressure of (e.g., expand) the liquid refrigerant received from the condenser 34. During the expansion process, a portion of the liquid may vaporize, and thus, the intermediate vessel 70 may be used to separate the vapor from the liquid received from the first expansion device 66. Additionally, the intermediate vessel 70 may provide for further expansion of the liquid refrigerant because of a pressure drop experienced by the liquid refrigerant when entering the intermediate vessel 70 (e.g., due to a rapid increase in volume experienced when entering the intermediate vessel 70). The vapor in the intermediate vessel 70 may be drawn by the compressor 32 through a suction line 74 of the compressor 32. In other embodiments, the vapor in the intermediate vessel may be drawn to an intermediate stage of the compressor 32 (e.g., not the suction stage). The liquid that collects in the intermediate vessel 70 may be at a lower enthalpy than the liquid refrigerant exiting the condenser 34 because of the expansion in the expansion device 66 and/or the intermediate vessel 70. The liquid from intermediate vessel 70 may then flow in line 72 through a second expansion device 36 to the evaporator 38.

The liquid refrigerant delivered to the evaporator 38 may absorb heat from another cooling fluid, which may or may not be the same cooling fluid used in the condenser 34. The liquid refrigerant in the evaporator 38 may undergo a phase change from the liquid refrigerant to a refrigerant vapor. As shown in the illustrated embodiment of FIG. 3, the evaporator 38 may include a tube bundle 58 having a supply line 60S and a return line 60R connected to a cooling load 62. The cooling fluid of the evaporator 38 (e.g., water, ethylene glycol, calcium chloride brine, sodium chloride brine, or any other suitable fluid) enters the evaporator 38 via return line 60R and exits the evaporator 38 via supply line 60S. The evaporator 38 may reduce the temperature of the cooling fluid in the tube bundle 58 via thermal heat transfer with the refrigerant. The tube bundle 58 in the evaporator 38 can include a plurality of tubes and/or a plurality of tube bundles. In any case, the vapor refrigerant exits the evaporator 38 and returns to the compressor 32 by a suction line to complete the cycle.

As noted above, the intermediate vessel 70, which is referred to hereinafter as an economizer 70 (e.g., flash tank economizer), improves the efficiency and the capacity of the vapor compression system 14 when a suitable pressure difference is available between the economizer 70 and the compressor 32. However, the vapor compression system 14 may operate at part loads (e.g., part refrigeration loads, part chiller loads) under certain situations, which may cause the vapor in the economizer 70 to be less effective at economizing the vapor compression system 14 and/or less pressurized than an inlet portion of the compressor 32 to which the vapor is directed. As such, it may be desirable to close the suction line 74 fluidly coupling the economizer 70 and the compressor 32 during part loads to provide operational benefits, such as preventing or reducing oil leakage backward along the suction line 74 (e.g., from the compressor 32 to the economizer 70). Discussed in more detail below, the presently disclosed economizer control system may control vapor flow along the suction line 74 automatically via self-regulating or passively controlled elements, or in other embodiments, via actively controlled elements that receive control signals.

Figure 4:
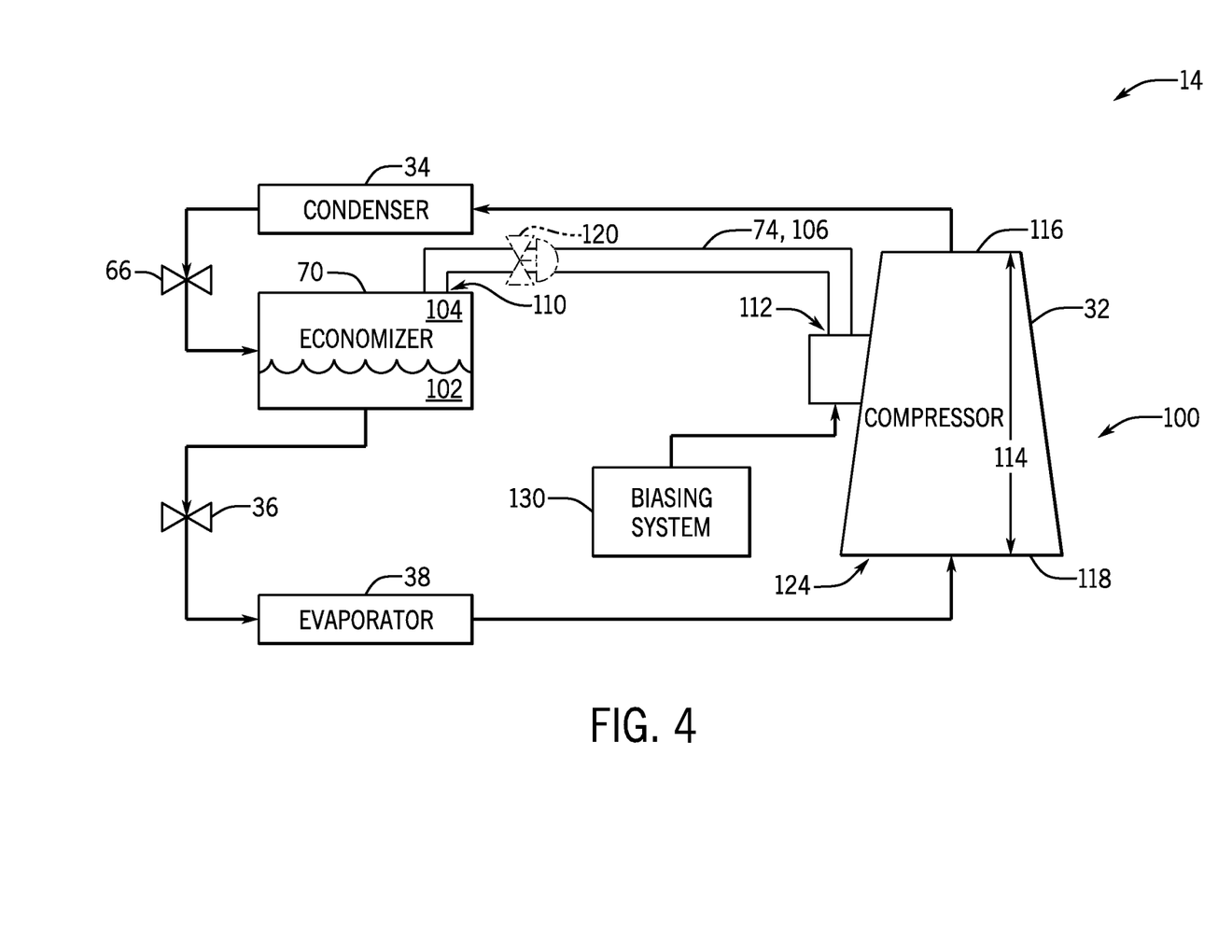
FIG. 4 is a schematic of an embodiment of an economizer control system of a vapor compression system, in accordance with an aspect of the present disclosure.

As an example, FIG. 4 is a schematic diagram of the vapor compression system 14 having an economizer control system 100 for regulating operation of the economizer 70. As illustrated, the vapor compression system 14 includes the compressor 32, the condenser 34, the first expansion device 66, the economizer 70, and the second expansion device 36 discussed above. The economizer 70 is a flash tank in the present embodiment, and therefore, expands and separates the fluid received from the first expansion device 66 into a liquid 102 (e.g., economizer liquid) and a vapor 104 (e.g., economizer vapor). The vapor compression system 14 also includes a vapor conduit 106, corresponding to the suction line 74, which directs the vapor 104 from a vapor outlet 110 of the economizer 70 and to an inlet port 112 of the compressor 32. The inlet port 112 of the compressor 32 may be disposed at any suitable position along a length 114 of the compressor 32, based on a capacity, a refrigerant type, and/or any other suitable operating parameters of the vapor compression system 14. For example, by positioning the inlet port 112 closer to a discharge end 116 of the compressor 32 than a suction end 118 of the compressor 32, the inlet port 112 may have a relatively high pressure that corresponds to a high pressure threshold for the vapor 104.

The presently disclosed economizer control system 100 enables a traditional solenoid valve 120 (as illustrated in dotted lines) or other typical control valve to be omitted from the vapor conduit 106. Instead, the economizer control system 100 controls the flow of the vapor 104 from within a housing 124 of the compressor 32. For example, the economizer control system 100 generally includes a sliding piston or valve disposed within the housing 124 of the compressor 32. Moreover, the economizer control system 100 includes a biasing system 130 that directs operation of the sliding piston. Based on the pressure of the vapor 104, the sliding piston may either block, enable, or partially enable the vapor 104 to flow into a compression area of the compressor 32. As discussed herein, the economizer control system 100 thereby automatically controls the flow of the vapor 104 from the economizer 70, either passively (e.g., without the above-discussed control panel 40) or actively (e.g., based on instructions from the control panel 40). Embodiments of the economizer control system 100 that operate independently from the above discussed control panel 40 are described with reference to FIGS. 5 and 6, and embodiments of the economizer control system 100 that are actively controlled by operation of the control panel 40 are described with reference to FIGS. 7-9.

Figure 5:
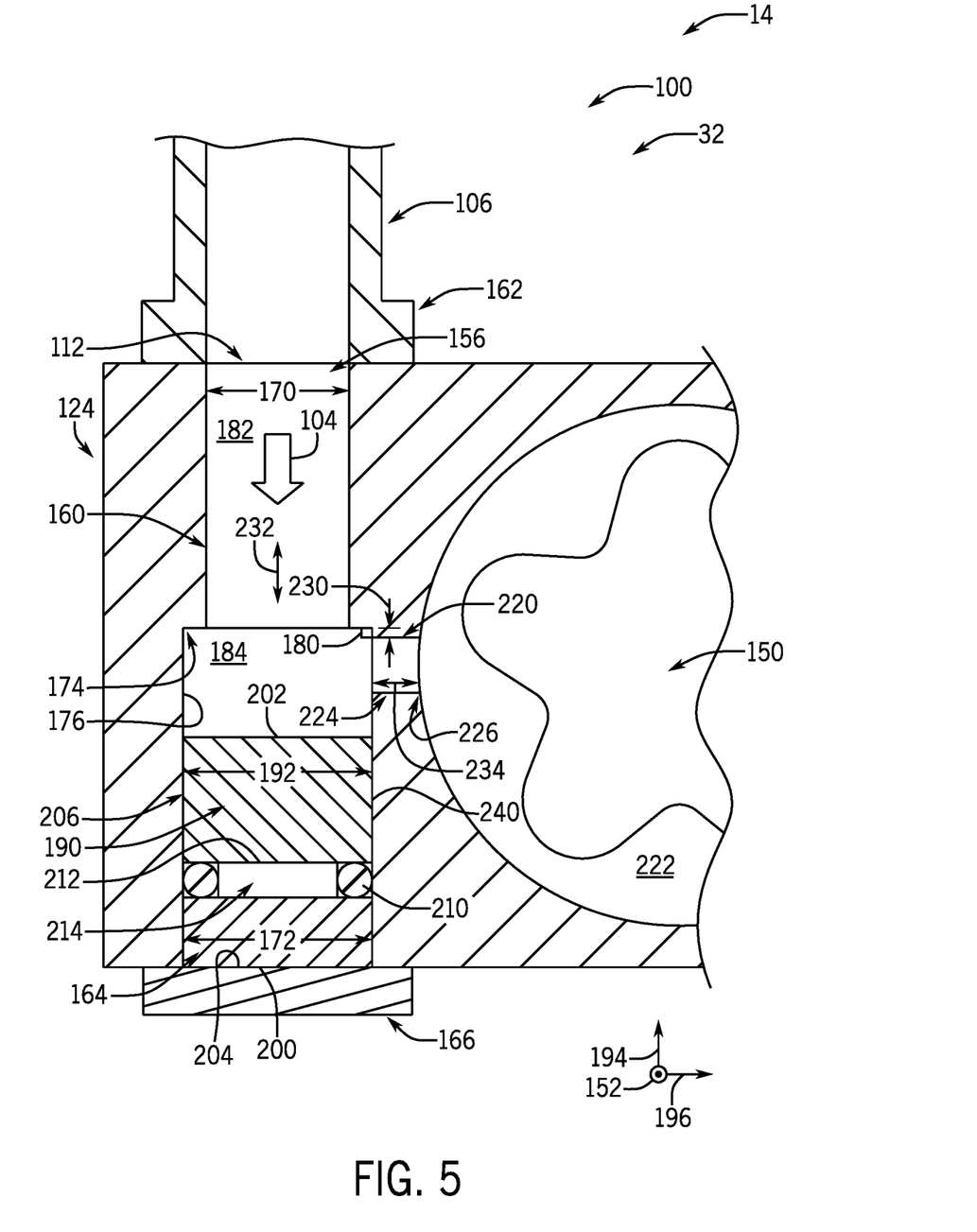
FIG. 5 is a cross-sectional view of an embodiment of the economizer control system of FIG. 4 having a piston in an open position, in accordance with an aspect of the present disclosure.

FIG. 5 is a cross-sectional schematic view of the housing 124 of the compressor 32, which has the economizer control system 100 disposed or integrally formed therein (e.g., native to the housing 124). As shown in the present embodiment, the compressor 32 is a screw compressor that has a male rotor 150 designed to cooperate with a female rotor to compress the refrigerant vapor received from the evaporator 38. The male rotor 150 and the female rotor generally extend along a z-axis 152 within the housing 124. Based on operation of the economizer control system 100, the refrigerant vapor within the compressor 32 may be automatically supplemented with the vapor 104 from the economizer 70.

In the illustrated embodiment, the economizer control system 100 includes the vapor conduit 106, which is coupled to the inlet port 112 of the housing 124 of the compressor 32 at a proximal end 156 of an intersecting channel 160 (relative to the economizer 70). A flange 162 is illustrated between the housing 124 and the vapor conduit 106, though it should be understood that any suitable coupling components may be utilized to connect the vapor conduit 106 and the housing 124. Additionally, in the present embodiment, a distal end 164 of the intersecting channel 160 is sealed by a cover 166 that is coupled to the housing 124. For example, the cover 166 may be sealed by a weld, fasteners, adhesive, or any other suitable attachment components.

The intersecting channel 160 of the economizer control system 100 may be any suitably-sized open volume that is formed, drilled, or bored within the housing 124. Moreover, the intersecting channel 160 has a proximal diameter 170 at the proximal end 156 thereof that is smaller than a distal diameter 172 of the distal end 164 of the intersecting channel 160. As such, a shoulder 174 or abutment is formed from walls 176 of the intersecting channel 160 as an interface between the ends 156, 164, in the present embodiment. Although illustrated as having a right angle 180, it should be noted that the shoulder 174 may have any suitable form, including one with smoothed or chamfered edges. As will be understood, a fluid chamber 182 is thereby formed within the intersecting channel 160 between the proximal end 156 and the shoulder 174, and a piston chamber 184 is formed within the intersecting channel 160 between the distal end 164 and the shoulder 174. In other words, the intersecting channel 160 is divided into the fluid chamber 182 and the piston chamber 184.

The economizer control system 100 includes a piston 190 (e.g., sliding piston, valve) disposed within the piston chamber 184 of the intersecting channel 160. The piston 190 has a piston width 192 or diameter that enables the piston 190 to be received in the piston chamber 184 and that blocks the piston 190 from moving past the shoulder 174 and/or into the fluid chamber 182 of the intersecting channel 160. The piston 190 may therefore move along a y-axis 194 within the piston chamber 184 of the intersecting channel 160, while the walls 176 block or prevent movement of the piston 190 along an x-axis 196. In particular, the biasing system 130 introduced above and discussed in more detail below may apply force to a distal surface 200 of the piston 190 to bias a proximal surface 202 of the piston 190 toward the shoulder 174. In the present embodiment, the vapor 104 from the economizer 70 is sufficiently pressurized to move retain the piston 190 in an open position 206, in which the distal surface 200 of the piston 190 contacts or nearly contacts an internal wall 204 of the cover 166. The piston 190 may have any suitable shape that corresponds to the shape of the piston chamber 184, such as a cylindrical shape, a rectangular prism shape, and so forth.

In the illustrated embodiment, a seal 210 (e.g., O-ring, gasket) is disposed around a middle portion 212 of a main body 214 of the piston 190 to block the vapor 104 from contacting or pooling proximate to the cover 166, though it should be understood that the seal 210 may be positioned elsewhere along the main body 214, multiple seals 210 may be included in the economizer control system 100, or the seal 210 may be omitted. Additionally, in certain embodiments, the cover 166 of the economizer control system 100 may be integrally formed with the housing 124, such that the intersecting channel 160 is open at the proximal end 156 and has remained sealed at the distal end 164. In such embodiments, the economizer control system 100 may be constructed by forming the intersecting channel 160 having the piston width 192 throughout, inserting the piston 190, and installing an annular element in the intersecting channel 160 to form the fluid chamber 182 between the shoulder 174 and the flange 162.

The economizer control system 100 also includes a passageway 220 (e.g., internal passageway) that fluidly couples the piston chamber 184 of the intersecting channel 160 to a compression area 222 of the compressor 32. As used herein, the compression area 222 denotes a portion of the compressor 32 that operates to compress the refrigerant traveling therethrough. In particular, an upstream end 224 of the passageway 220 is coupled to the piston chamber 184 near or proximate the shoulder 174, and a downstream end 226 of the passageway is coupled to the compression area 222. However, in accordance with present embodiments, the passageway 220 is spaced from the shoulder 174 relative to the y-axis 194 by a separation distance 230, so that the fluid chamber 182 is not directly coupled to the passageway 220. In other words, a flow path of the vapor 104 through the housing 124 intersects or passes through at least a portion of the piston chamber 184. Moreover, in the present embodiment, a longitudinal axis 232 of the intersecting channel 160 is perpendicular to a longitudinal axis 234 of the passageway 220, which extends along the x-axis 196. However, it should be understood that the longitudinal axes 232, 234 may intersect one another at any suitable angle, provided that the passageway 220 is angled or crosswise relative to the intersecting channel 160. As used herein, the portions of the intersecting channel 160 and the passageway 220 that direct flow of the vapor 104 may be collectively referred to as an actuatable flow path or an L-shaped flow path. Additionally, in some embodiments, the economizer control system 100 may include multiple passageways 220 coupled to a single intersecting channel 160, thereby enabling modular economizing based on a number of passageways 220 that are sealed or unsealed by the piston 190.

As discussed in more detail below, in the absence of sufficient vapor flow, the biasing system 130 naturally forces or biases the piston 190 into the closed position, in which a lateral surface 240 of the piston 190 closes or seals the passageway 220 relative to the intersecting channel 160. Accordingly, during operation of the vapor compression system 14, the vapor 104 may enter the intersecting channel 160 and contact the proximal surface 202 of the piston 190. In response to the vapor 104 having a suitable pressure, such as a pressure above a predefined threshold pressure of the biasing system 130, the vapor 104 may move or actuate the piston 190 into the illustrated open position 206. Therefore, the suitably-pressurized vapor 104 may enter the compression area 222 of the compressor 32 to economize operation of the vapor compression system 14. Additionally, it should be understood that, based on the pressure of the vapor 104, the piston 190 may be positioned in a partially open or a partially closed position that blocks a first portion (e.g., cross-section) of the passageway 220 and enables the vapor 104 to flow through a remaining, second portion of the passageway 220. That is, the piston 190 may have a partially open position in response to the vapor 104 having a pressure greater than a first threshold pressure and less than a higher, second threshold pressure.

Figure 6:
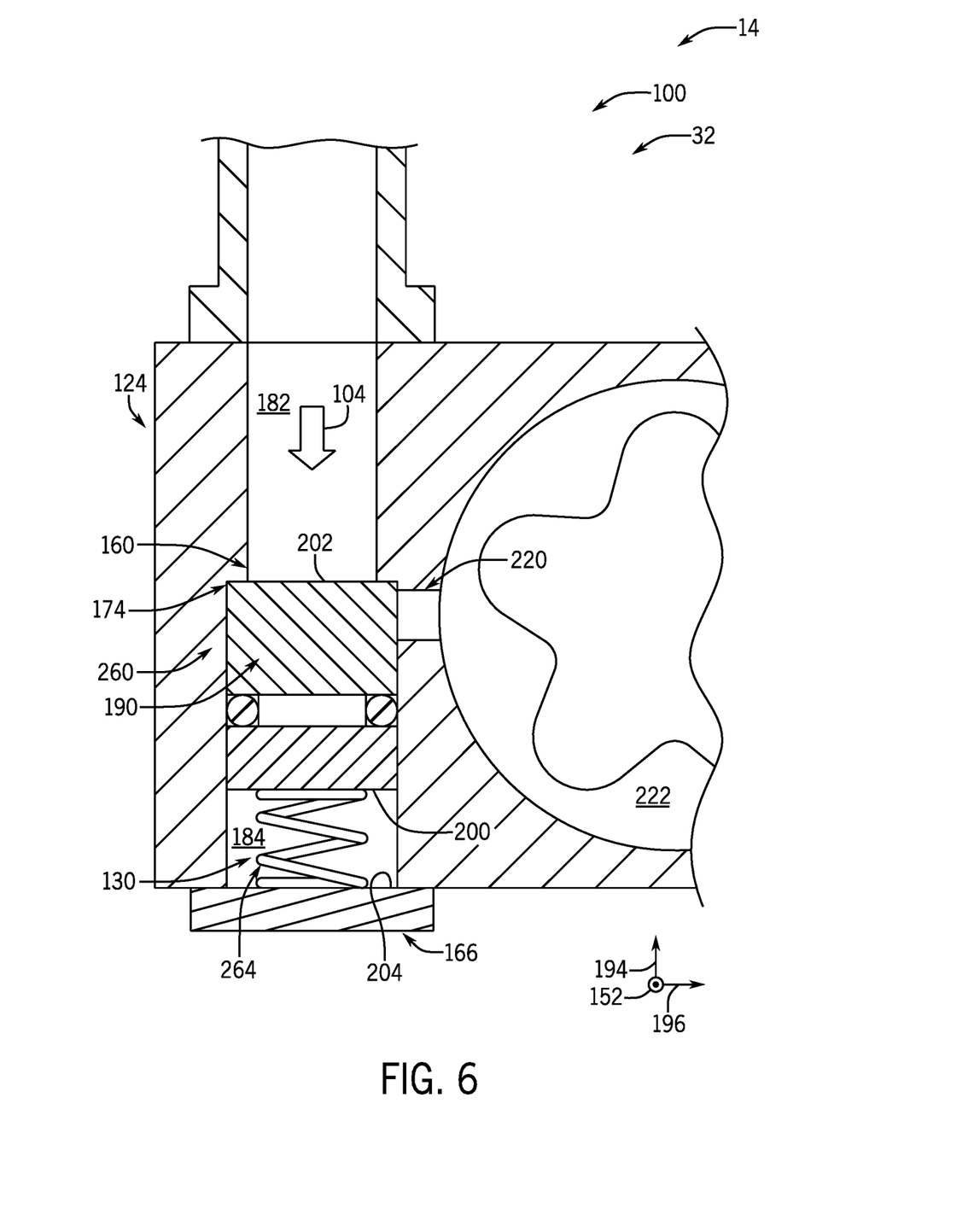
FIG. 6 is a cross-sectional view of an embodiment of the economizer control system of FIG. 5 having the piston biased to a closed position, in accordance with an aspect of the present disclosure.

FIG. 6 is a schematic cross-sectional view of the economizer control system 100 of FIG. 5, in which the piston 190 is moved to a closed position 260 via the biasing system 130. Generally, the biasing system 130 operates to position the piston 190 in the closed position 260 in response to sufficient pressure not being applied to the piston 190 by the vapor 104 of the economizer 70. In the present embodiment, the biasing system 130 includes a mechanical spring 264 that is coupled between the internal wall 204 of the cover 166 and the distal surface 200 of the piston 190. Based on its sizing and/or mechanical properties, the mechanical spring 264 may be designed to be either at equilibrium or compressed when the piston 190 is in the closed position 260. However, in other embodiments, the mechanical spring 264 may be free or unattached on one end.

Additionally, it should be understood that the mechanical spring 264 may alternatively be coupled between the proximal surface 202 of the piston 190 and an upstream portion of the intersecting channel 160, provided that the mechanical spring 264 is stretched or formed to bias the piston 190 against the shoulder 174. Moreover, it should be understood that the mechanical spring 264, which is a cylindrical coil spring in the present embodiment, may be replaced by or include any other suitable physical biasing component, such as a conical coil spring, a compound spring, an elastomer, a leaf spring, conical spring washers, a gas spring, a magnetic repulsion assembly, any combination thereof, and so forth.

Additionally, because the piston 190 moves along the y-axis 194 within the piston chamber 184 of the intersecting channel 160, any fluid within the compression area 222 of the compressor 32 that attempts to backflow into the intersecting channel 160 does not affect the positioning of the piston 190 and, therefore, may be stopped or blocked by the piston 190. That is, fluid flowing along the x-axis 196 is generally not able to move the piston 190 along the y-axis 194. As such, the pressure of the vapor 104 from the economizer 70 operates as a regulatory force that automatically controls the piston 190 to selectively open or close the passageway 220 based on its pressure. Accordingly, the economizer control system 100 enables the piston 190 to automatically close the passageway 220 and halt economizing of the compressor 32 in response to the pressure of the vapor 104 decreasing below the threshold pressure set by the biasing system 130.

Figure 7:
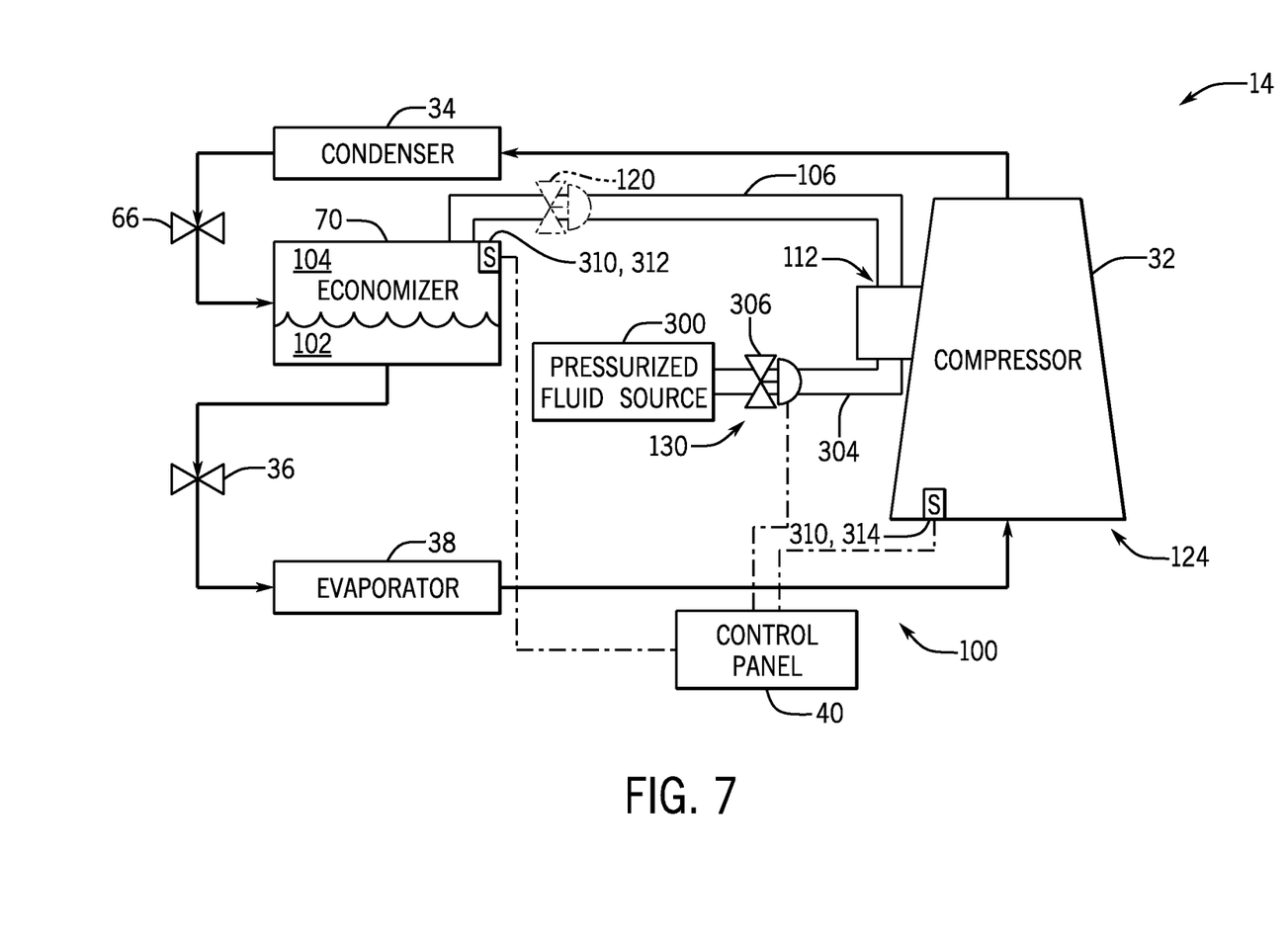
FIG. 7 is a schematic of an embodiment of an economizer control system utilizing a pressurized fluid source to control economizer vapor flow, in accordance with an aspect of the present disclosure.

As another example, FIG. 7 is a schematic diagram of the vapor compression system 14 having a control-panel-driven or actively controlled embodiment of the economizer control system 100, which selectively enables the vapor 104 to flow from the economizer 70, along the vapor conduit 106, and into the compressor 32. In particular, the biasing system 130 of the economizer control system 100 includes a pressurized fluid source 300 that directs a pressurized fluid along a pressurized fluid conduit 304 to the inlet port 112 of the compressor 32. As will be understood, the pressurized fluid may generally operate to bias the piston 190 discussed above against the shoulder 174 within the housing 124 of the compressor 32 in a manner similar to the mechanical spring 264. Moreover, the biasing system 130 includes a valve 306 (e.g., solenoid valve, variable orifice valve) that is disposed along the pressurized fluid conduit 304 and controlled by the control panel 40 (e.g., controller). However, compared to the solenoid valve 120 of traditional vapor compression system that lack the economizer control system 100, the valve 306 is generally, smaller, more reliable, and does not generate a pressure drop within the vapor 104 from the economizer 70 (e.g., because the vapor 104 does not pass through the valve 306).

The control panel 40 facilitating operation of the economizer control system 100 may also be coupled to any suitable sensors 310 of the vapor compression system 14, such as an economizer sensor 312 and a compressor sensor 314. The sensors 310 may detect or sense any suitable operating parameters of the economizer 70 and the compressor 32, respectively, and transmit sensor signals to the control panel 40 indicative of the operating parameters. For example, the economizer sensor 312 may monitor the pressure, temperature, liquid level, flow rate, and so forth of the refrigerant entering, within, or exiting the economizer 70. Similarly, the compressor sensor 314 may monitor the pressure, temperature flow rate, motor speed, and so forth of the refrigerant within the compressor 32 or the compressor itself. Based on any suitable embodiments of the sensors 310, the control panel 40 may determine a pressure difference between the economizer 70 and the compressor 32, and then control the valve 306 based on the pressure difference, as discussed below.

Figure 8:
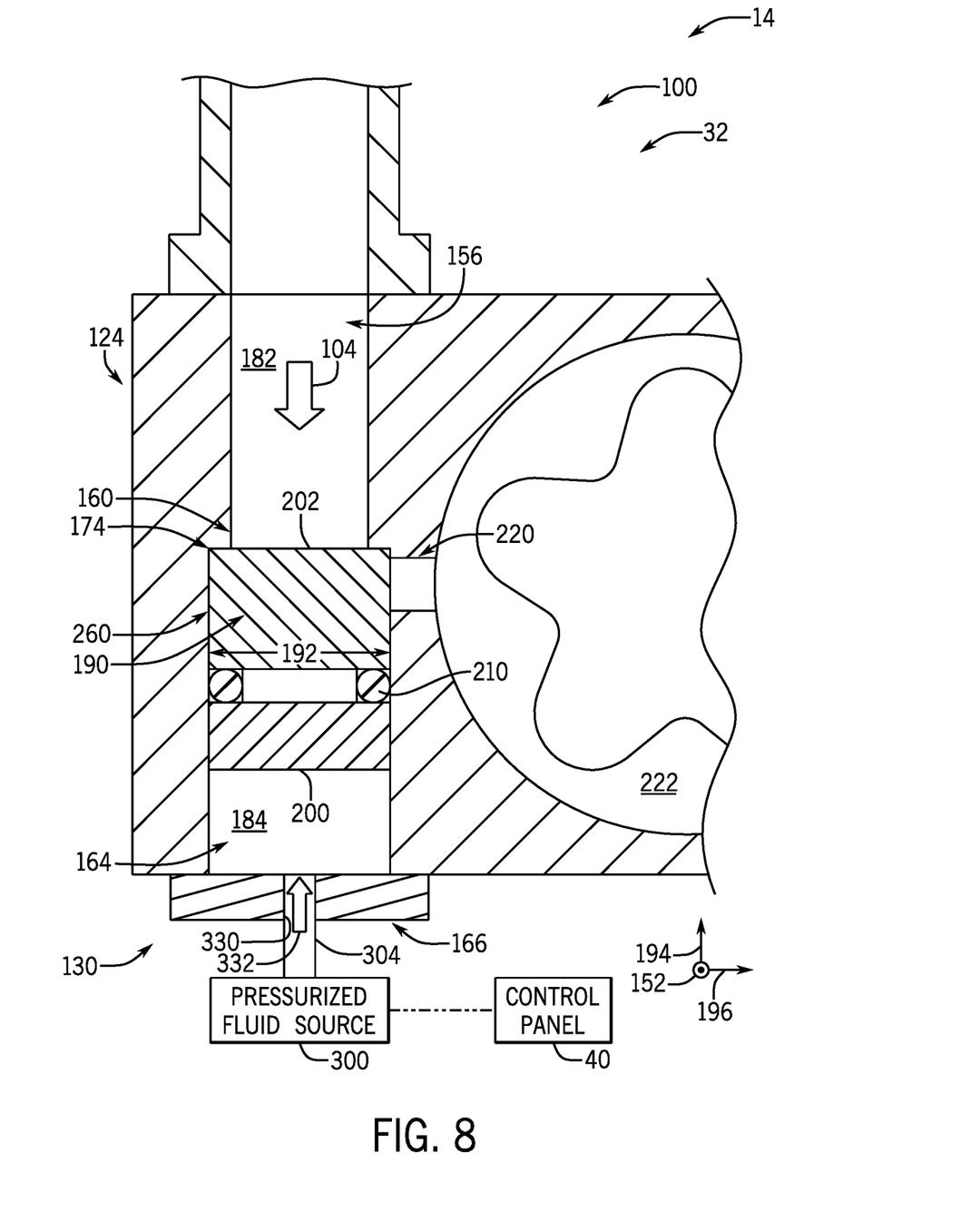
FIG. 8 is a cross-sectional view of an embodiment of the economizer control system of FIG. 7 biasing the piston to the closed position, in accordance with an aspect of the present disclosure.

FIG. 8 is a cross-sectional schematic diagram of an embodiment of the economizer control system 100, which is integrated with the housing 124 of the compressor 32 to automatically control economizing of the compression area 222 of the compressor 32. As discussed above, the economizer control system 100 includes the passageway 220, as well as the intersecting channel 160 that defines the fluid chamber 182 and the piston chamber 184 within the housing 124. The economizer control system 100 also includes the biasing system 130 to control movement of the piston 190 within the piston chamber 184 relative to the passageway 220 (e.g., between the open position and the illustrated closed position 260). In the present embodiment, the biasing system 130 includes the pressurized fluid source 300, as well as the pressurized fluid conduit 304 that extends from the pressurized fluid source 300, through an opening 330 in the cover 166, and to the distal end 164 of the piston chamber 184. The pressurized fluid source 300 may include an external pressurized fluid source, such as a canister of any suitable gas (e.g., buffer gas, refrigerant vapor). In some embodiments, the pressurized fluid source 300 may instead be a source of high pressure vapor from another suitable portion of the vapor compression system 14, such as another port of the compressor 32, a vapor flow directed from a point that is downstream of the compressor 32 and upstream of the condenser 34, and so forth.

Moreover, the pressurized fluid source 300 may direct pressurized fluid 332 that is any suitable liquid, vapor, or combination thereof to the distal surface 200 of the piston 190. In some embodiments, the pressurized fluid 332 is a same fluid (e.g., chemical composition) as the vapor 104. In other embodiments, such as embodiments in which the seal 210 of the piston 190 fluidly isolates the vapor 104 from the pressurized fluid 332 or embodiments in which the pressurized fluid 332 is compatible with the vapor 104, the pressurized fluid 332 may be different than the vapor 104. Additionally, it should be understood that the biasing system 130 may include any suitable components that enable the pressurized fluid source 300 to direct the pressurized fluid 332 to the distal surface 200 of the piston 190. For example, in other embodiments, the pressurized fluid conduit 304 may be sized to have a width equal to the piston width 192, such that the cover 166 may be omitted and the pressurized fluid conduit 304 may be directly coupled to the housing 124. In any case, based on actuation of the pressurized fluid source 300 (and/or the valve 306) by the control panel 40, the pressurized fluid source 300 may direct the pressurized fluid 332 to the piston chamber 184, thereby actuating the piston 190 to the closed position 260.

Figure 9:
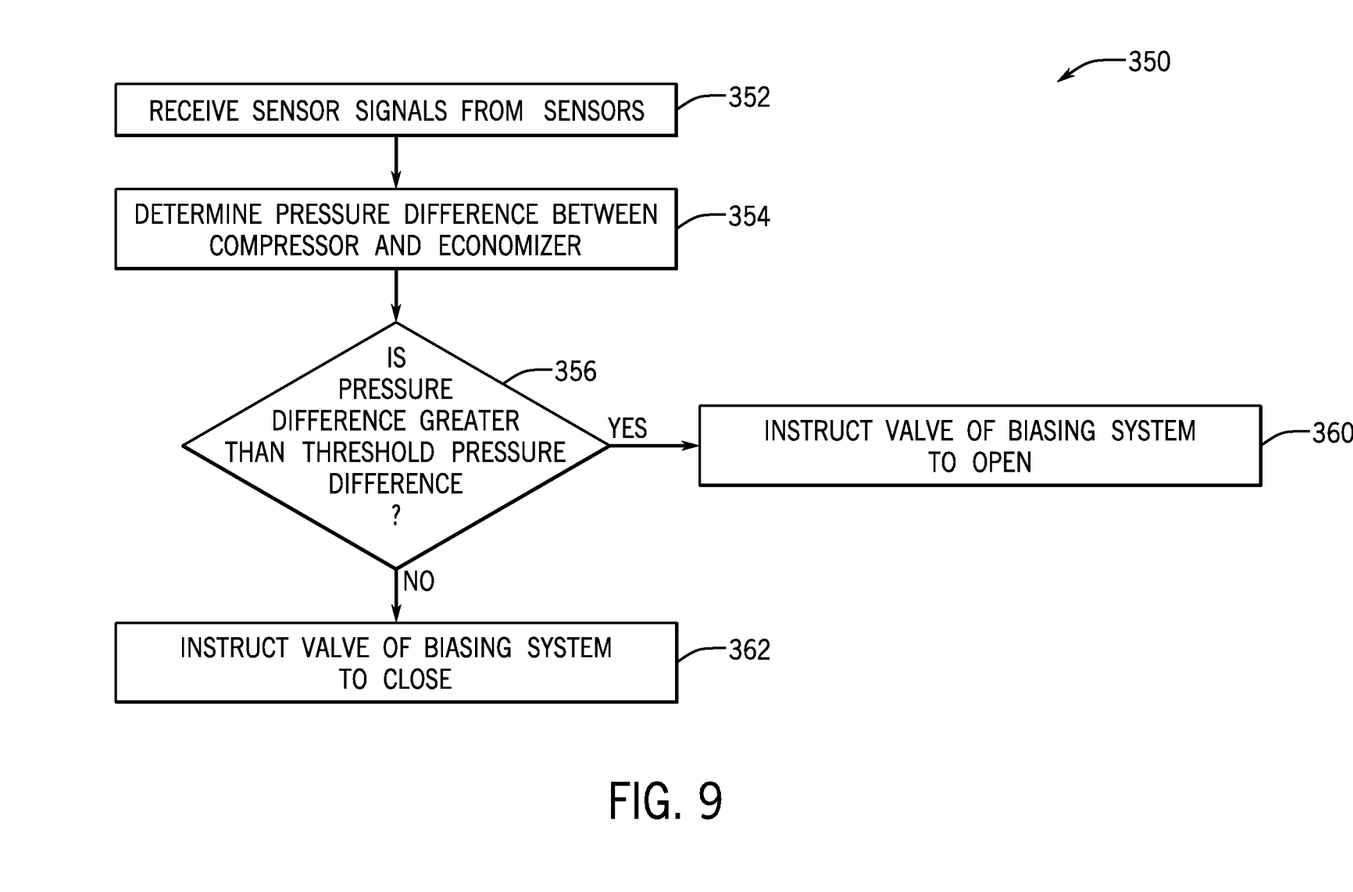
FIG. 9 is a flow diagram of an embodiment of a process for operating the economizer control system of FIG. 7, in accordance with an aspect of the present disclosure.

FIG. 9 is a flow diagram of an embodiment of a process 350 by which the control panel 40 directs operation of the economizer control system 100 to selectively enable economizing of the compressor 32 based on actuation of the valve 306. The steps illustrated in the process 350 are meant to facilitate discussion and are not intended to limit the scope of this disclosure, because additional steps may be performed, certain steps may be omitted, and the illustrated steps may be performed in an alternative order or in parallel, where appropriate. The process 350 may be representative of initiated code or instructions stored in a non-transitory computer-readable medium (e.g., the non-volatile memory 46) and executed, for example, by the microprocessor 44 of the control panel 40 of the economizer control system 100. The microprocessor 44 may be communicatively coupled via a network, such as a wireless network or a wired network, to receive and send the instructions and signals described below.

The control panel 40 performing the illustrated embodiment of the process 350 receives (block 352) sensor signals from the sensors 310. For example, the sensor signals may include any suitable signals indicative of the pressure in the economizer 70 and/or the pressure in the compressor 32. It should be understood that the signals indicative of the pressure may include signals related to other state parameters of the refrigerant, such as temperature or flowrate, from which the pressure may be determined. Thus, based on the sensor signals, the control panel 40 may determine (block 354) a pressure difference between the compressor 32 and the economizer 70.

Continuing the process 350, the control panel 40 may determine (block 356) whether the pressure difference is greater than a threshold pressure difference, which may be a parameter stored within the non-volatile memory 46 of the control panel 40. The threshold pressure difference may be set and stored as any suitable number above which economizing of the compressor 32 is beneficial to operation of the vapor compression system 14. In some embodiments, the threshold pressure difference is set as suitable number above which oil is unlikely or unable to leak backward along the vapor conduit 106.

Additionally, the threshold pressure difference may be dynamically adjustable over time and/or changeable based on user input, in certain embodiments. In other embodiments, the control panel 40 may instead perform blocks 354 and 356 directly based on the pressures of the compressor 32 and the economizer 70, and further, based on determination of whether the pressure of the compressor 32 is greater than the pressure of the economizer 70 by a threshold difference or percentage. Moreover, other embodiments of the process 350 may determine whether an operating load or refrigeration load of the vapor compression system 14 is greater than an operating load threshold, which is indicative of operating points for which economizing may improve efficiency of the vapor compression system 14. In certain load-based embodiments, the control panel 40 may control the valve 306 based on signals sent from the compressor 32 or sent to the compressor 32, such as signals directly indicative of a current speed of the compressor 32 that enable the control panel 40 to derive the operating load of the vapor compression system 14 therefrom.

In any case, in response to determining that the vapor 104 from the economizer 70 is not suitably pressurized, the control panel instructs (block 360) the valve 306 of the biasing system 130 to open or remain open, thereby directing the pressurized fluid 332 to bias the piston 190 to the closed position 260. As discussed above, the piston 190 therefore seals the passageway 220 from the vapor conduit 106, blocking or preventing oil backflow from the compressor 32.

Alternatively, in response to determining that the vapor 104 is suitably pressurized, the control panel instructs (block 362) the valve 306 to close (or partially close). As such, the pressurized fluid 332 does not bias the piston 190 to the closed position 260 and enables the vapor 104 to move the piston 190 to the open position 206 or a partially open position. For example, in certain embodiments, the economizer control system 100 may operate based on multiple pressure thresholds that enable the piston 190 to move to the partially open position, such as a position in which the single passageway 220 is partially sealed, or alternatively, a position in which a first portion of multiple passageways 220 are sealed and a second portion of the multiple passageways 220 are open. The vapor 104 may therefore flow from the intersecting channel 160, through the passageway 220, and into the compression area 222 to economize the compressor 32. It should be understood that, in other embodiments, the control panel 40 performing block 362 instructs the valve 306 to remain in a suitable position that enables the pressurized fluid 332 to operate as a spring or a constant biasing force, which the vapor 104 from the economizer 70 may overcome in situations in which the vapor 104 is suitably pressurized.

As set forth above, the present disclosure may provide one or more technical effects useful in controlling economizing of the compressor 32 of the vapor compression system 14, based on a pressure of the vapor 104 from the economizer 70. Embodiments of the disclosure may include an economizer control system 100 that includes a flow path for the vapor 104 to travel from an inlet port 112 to a compression area 222 of the compressor 32, as well as a piston 190 that is biased to seal or close the flow path against flows of the vapor 104 that are below a threshold pressure. For example, the economizer control system 100 includes a biasing system 130 that applies force to a distal surface 200 of the piston 190, thereby biasing the piston to a closed position 260 that seals the flow path. In some cases, the biasing system 130 includes a mechanical spring 264, another mechanical biasing element, or a pressurized fluid source 300 that is coupled to a piston chamber 184 that the flow path is extended across. In any case, in response to the vapor 104 having a threshold pressure, the vapor 104 may actuate the piston 190 to the open position 206, thereby enabling the suitably-pressurized vapor 104 to automatically economize operation of the compressor 32. The economizer control system 100 may therefore reduce pressure drop or cost issues associated with large solenoid valves 120 of traditional control systems, while blocking or preventing oil leakage backward from the compressor 32 to the economizer 70. The technical effects and technical problems in the specification are examples and are not limiting. It should be noted that the embodiments described in the specification may have other technical effects and can solve other technical problems.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out the disclosure, or those unrelated to enabling the claimed disclosure). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. An economizer control system for a vapor compression system, comprising:
    a compressor including a compression area, a piston chamber, and an economizer inlet configured to receive economizer vapor into the compression area via a flow path that extends between the economizer inlet and the compression area, wherein at least a portion of the flow path traverses the piston chamber;
    a piston disposed within the piston chamber and configured to contact the economizer vapor, wherein the piston is moveable between an open position that opens the flow path and a closed position that closes the flow path; and
    a piston biaser configured to apply force to the piston to bias the piston toward the closed position, wherein the piston biaser is configured to allow the piston to transition to the open position in response to the economizer vapor having at least a threshold pressure that operatively exerts a counterforce on the piston that overcomes the force of the piston biaser.

2. The economizer control system of claim 1, wherein the flow path comprises:
    a channel having a first end defined by the economizer inlet and a second end defined by the piston chamber; and
    a passageway having a third end defined by the piston chamber and a fourth end defined by the compression area, wherein the piston in the closed position is configured to seal the third end of the passageway to close the flow path.

3. The economizer control system of claim 2, wherein the piston in the closed position is configured to remain in the closed position in response to fluid directed from the compression area to the passageway, wherein the fluid comprises oil, refrigerant, or both.

4. The economizer control system of claim 1, wherein the piston biaser is integrated within a housing of the compressor.

5. The economizer control system of claim 1, wherein the piston biaser comprises a spring disposed between a surface of the piston and an opposing surface of the piston chamber.

6. The economizer control system of claim 1, wherein the piston biaser comprises a pressurized fluid source configured to direct a pressurized fluid to a surface of the piston to bias the piston toward the closed position.

7. The economizer control system of claim 6, comprising a controller, wherein the piston biaser comprises:
a conduit fluidly coupling the pressurized fluid source to the piston chamber; and
a valve disposed along the conduit and communicatively coupled to the controller, wherein the controller is configured to control the valve to adjust application of the pressurized fluid to the surface of the piston.

8. The economizer control system of claim 7, wherein the controller is configured to control the valve to set the threshold pressure of the piston biaser based on a pressure difference between the compressor and an economizer configured to provide the economizer vapor.

9. A vapor compression system, comprising:
an economizer comprising a vapor outlet;
a compressor comprising a housing that defines a compression area, wherein the housing comprises:
a channel configured to receive vapor from the vapor outlet of the economizer; and
a passageway disposed between and communicatively coupled with the channel and the compression area, wherein the passageway extends crosswise to the channel and is configured to direct the vapor from the channel to the compression area;
a piston configured to move within the channel; and
a piston biaser configured to bias the piston to a closed position in which the piston seals the passageway relative to the channel, wherein, in response to the vapor having a threshold pressure, the piston biaser is configured to enable the piston to move to an open position in which the piston enables the vapor to flow from the channel, through the passageway, and into the compression area.

10. The vapor compression system of claim 9, comprising a conduit that fluidly couples the vapor outlet of the economizer to the channel of the housing, wherein the conduit excludes a solenoid valve.

11. The vapor compression system of claim 9, wherein the channel comprises a piston chamber that retains the piston therein, wherein the passageway comprises an opening that is coupled to the piston chamber, and wherein the piston in the closed position is configured to seal the opening to seal the passageway relative to the channel.

12. The vapor compression system of claim 11, wherein a portion of the channel that is upstream relative to the piston chamber and a flow of the vapor comprises a first width, and wherein the piston chamber comprises a second width that is larger than the first width.

13. The vapor compression system of claim 11, wherein the piston biaser comprises a coil spring disposed between the piston and a wall of the piston chamber.

14. The vapor compression system of claim 9, wherein the piston comprises a main body having a first surface configured to contact the vapor and having a second surface configured to receive a biasing force from the piston biaser, and wherein the second surface is opposite the first surface.

15. The vapor compression system of claim 9, wherein the piston biaser comprises a pressurized fluid source configured to direct a pressurized fluid to a surface of the piston to bias the piston to the closed position.

16. The vapor compression system of claim 15, comprising:
a conduit fluidly coupling the pressurized fluid source to the housing;
a valve disposed along the conduit; and
a controller communicatively coupled to the valve, wherein the controller is configured to instruct the valve to adjust a flow of the pressurized fluid to set the threshold pressure of the piston biaser.

17. A method of economizing a vapor compression system using a controller, comprising:
directing economizer vapor from an economizer to an economizer inlet of a housing of a compressor, wherein the housing comprises a flow path that traverses a piston chamber of the housing and extends between the economizer inlet and a compression area of the housing;
biasing a piston disposed within the piston chamber toward a closed position via a piston biaser of the vapor compression system, wherein the piston in the closed position is configured to block the flow path to fluidly separate the economizer inlet from the compression area; and
in response to the economizer vapor having at least a threshold pressure, enabling the economizer vapor to move the piston to an open position that enables the economizer vapor to flow to the compression area from the piston chamber.

18. The method of claim 17, comprising:
in response to the economizer vapor having less than the threshold pressure, maintaining the piston in the closed position to block the economizer vapor from flowing to the compression area from the piston chamber and to block fluid from the compression area from flowing to the economizer.

19. The method of claim 17, comprising biasing the piston to the closed position via a spring of the piston biaser or a pressurized fluid flow of the piston biaser that is configured to apply a biasing force to a surface of the piston.

* * * * *